United States Patent
Greiner et al.

[11] Patent Number: 5,845,939
[45] Date of Patent: Dec. 8, 1998

[54] BELT TENSIONER

[75] Inventors: Gerhard Greiner, Heubach; Franz Seeberger, Schwäbisch Gmünd; Franz Wier, Untere Strasse, all of Germany

[73] Assignee: TRW Occupant Restraint Systems GmbH, Alfdorf, Germany

[21] Appl. No.: 824,710

[22] Filed: Apr. 14, 1997

[30] Foreign Application Priority Data

Apr. 16, 1996 [DE] Germany ............... 296 06 896 4

[51] Int. Cl.⁶ .................................................. B60R 22/46
[52] U.S. Cl. ........................ 280/806; 280/808; 297/480
[58] Field of Search .................... 280/806, 808; 297/480

[56] References Cited

U.S. PATENT DOCUMENTS

| | | |
|---|---|---|
| 4,008,909 | 2/1977 | Ontani et al. . |
| 4,015,860 | 4/1977 | Tisell et al. ............... 280/806 |
| 4,767,161 | 8/1988 | Sedlmayr et al. ....... 297/472 |

FOREIGN PATENT DOCUMENTS

| | | |
|---|---|---|
| 0205901 | 12/1986 | European Pat. Off. . |
| 0217175 | 4/1987 | European Pat. Off. . |
| 61-155039 | 7/1986 | Japan . |

*Primary Examiner*—Paul N. Dickson
*Attorney, Agent, or Firm*—Tarolli, Sundheim, Covell, Tumino & Szalo

[57] ABSTRACT

A belt tensioner for a 3-point vehicular seat belt system comprises a belt webbing, a belt retractor as a first anchoring point, a belt buckle as a second anchoring point, an end fitting as a third anchoring point of the seat belt system and a tensioner drive. To offer various possibilities of accommodation even under restricted space availability conditions in the vehicle, the tensioner drive engages the end fitting, or the webbing next to the end fitting. Upon activation of the tensioner drive, the tensioner drive exerts tension on the belt webbing.

5 Claims, 3 Drawing Sheets

BELT TENSIONER

The invention relates to a belt tensioner for a 3-point vehicular seat belt system comprising a belt webbing, a belt retractor as a first anchoring point, a belt buckle as a second anchoring point, an end fitting as a third anchoring point of the seat belt system and a tensioner drive.

BACKGROUND OF THE INVENTION

It is well known in the art, that a belt tensioner engages the belt retractor or the belt buckle. The belt tensioner is usually located at the B-pillar of the vehicle or, when engaging the belt buckle, it is fastened beside the seat to the floor of the vehicle. Under restricted space availability conditions, e.g. at the rear seats, such prior art configurations can be difficult to accommodate.

SUMMARY OF THE INVENTION

As compared to known belt tensioners, which engage the belt retractor or the belt buckle, the configuration according to the invention offers various possibilities of accommodation even under restricted space availability conditions in the vehicle, e.g. at the rear seats.

According to a first embodiment of the invention, a belt tensioner for a 3-point vehicular belt system is provided, which comprises a belt webbing, a belt retractor as a first anchoring point, a belt buckle as a second anchoring point, an end fitting as a third anchoring point of the seat belt system and a tensioner drive. The tensioner drive engages said end fitting. In case of an accident, the tensioner drive is activated and exerts tension on said belt webbing.

Further possible arrangements are achieved by a preferred variant in which the belt webbing is guided between the buckle and the end fitting via a deflector fitting anchored to the vehicle body. For instance, the tensioner drive may be arranged on the back of the rear seat, on the door sill or under the seat upholstery.

A further variant, wherein said tensioner drive is connected to said end fitting via a cable, is particularly advantageous when there is not enough room to position the tensioner drive directly adjacent the end fitting.

Advantageously, the tensioner drive is formed by a pyrotechnical linear drive.

According to a second embodiment of the present invention a belt tensioner for a 3-point vehicular seat belt system is provided, which comprises a belt webbing, a belt retractor as a first anchoring point, a belt buckle as a second anchoring point, an end fitting as a third anchoring point of the seat belt system and a tensioner drive. The tensioner drive engages the belt webbing at a point of engagement next to said end fitting between the belt buckle and the end fitting and exerts tension on the belt webbing when activated.

To further increase the number of possible arrangements, the belt webbing is guided between the belt buckle and the point of engagement of the tensioner drive via a deflector fitting, which is anchored to the vehicle body.

To reduce the overall length of the tensioner drive the latter engages the belt webbing between the deflector fitting and the end fitting in forming a belt loop, as a result of which the necessary tensioner stroke is halved.

Particularly advantageous under restricted space availability conditions is a variant of the second embodiment, wherein the deflector fitting and the end fitting are arranged alongside each other and are anchored to the vehicle body by means of a common through-bolt.

To reduce friction at the deflector fitting, it is advantageously provided with a rotatable deflector sheave or the deflector surface is provided with a friction diminishing surface structure.

BRIEF DESCRIPTION OF THE DRAWINGS

Various embodiments are shown in the attached drawings in which.

DESCRIPTION OF THE PREFERRED EMBODIMENT

Figure 1:
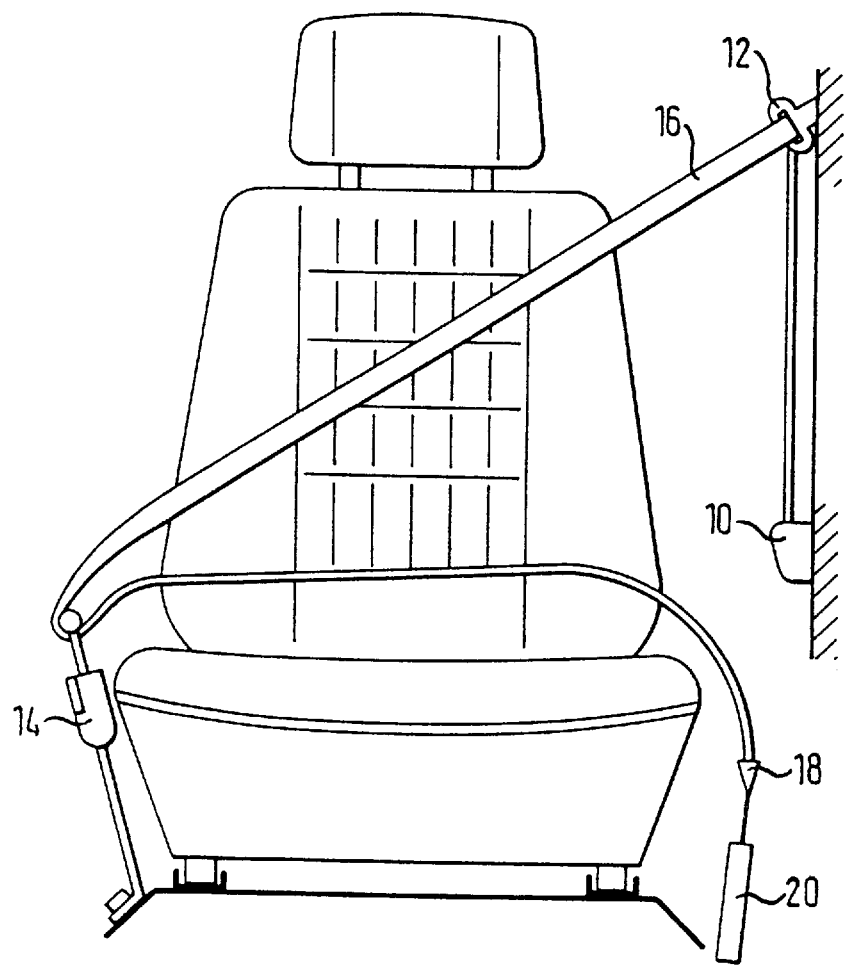
Fig. 1 shows a front view of a vehicle front seat and a 3-point seat belt system with a belt tensioner according to a first embodiment of the invention.

FIG. 1 shows a front seat in a vehicle having a 3-point seat belt system. A belt retractor 10 and an upper deflector fitting 12 are fastened to a side wall of the vehicle. A belt webbing 16 runs from the belt retractor 10 to the upper deflector fitting 12, to a belt buckle 14 and is terminated by an end fitting 18. The end fitting 18 is directly engaged by a pyrotechnical linear tensioner drive 20. The belt retractor 10, the belt buckle 14 and the end fitting 18 define three anchoring points of the seat belt system. The belt retractor 10 and the upper deflector fitting 12 are fastened directly to the vehicle body, whereas the belt buckle 14 is connected to the vehicle body by an additional fitting. In the first embodiment of the invention shown in FIG. 1, one end of the tensioner drive 20 engages the end fitting 18 and the other end thereof is fastened to the vehicle body. The tensioner drive 20 is activated by a conventional tripping device. Upon activation of the tensioner drive 20, the end fitting 18 is pulled down, thereby exerting tension on the belt webbing 16 and removing slack of the belt webbing 16.

Figure 2:
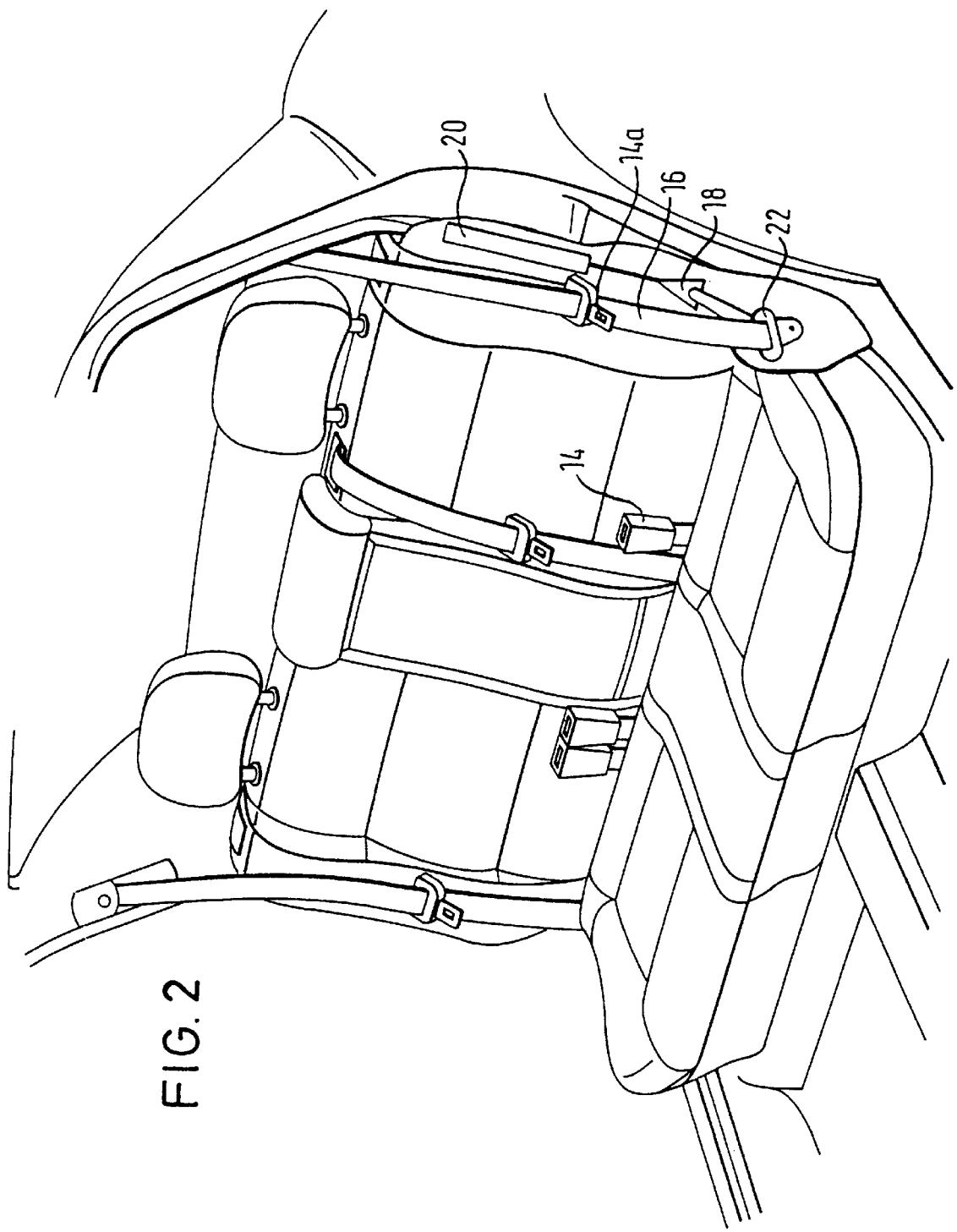
Fig. 2 shows a back seat arrangement provided with a variant of the belt tensioner according to the first embodiment of the invention, with parts of the back seat being cut away.

FIG. 2 shows a rear seat group in a vehicle having three 3-point seat belt systems. Parts of the back seat are cut away, to show the pyrotechnical linear tensioner drive 20, the end fitting 18 and a lower deflector fitting 22 of one seat belt system. All of the seat belt systems are provided with similar arrangements. The pyrotechnical linear tensioner drive 20 engages the end fitting 18 and the belt webbing 16 is guided between the belt buckle 14 or tongue 14a and the end fitting 18 via the lower deflector fitting 22. The tensioner drive 20 and the lower deflector fitting 22 are arranged under the seat upholstery. Thus, the tensioner drive 20 can be accommodated under the restricted space availability conditions at the rear seat. To avoid impeding of the belt webbing by friction occurring at the deflector fitting 22, the deflector surface ist provided with a friction diminishing surface.

Figure 3:
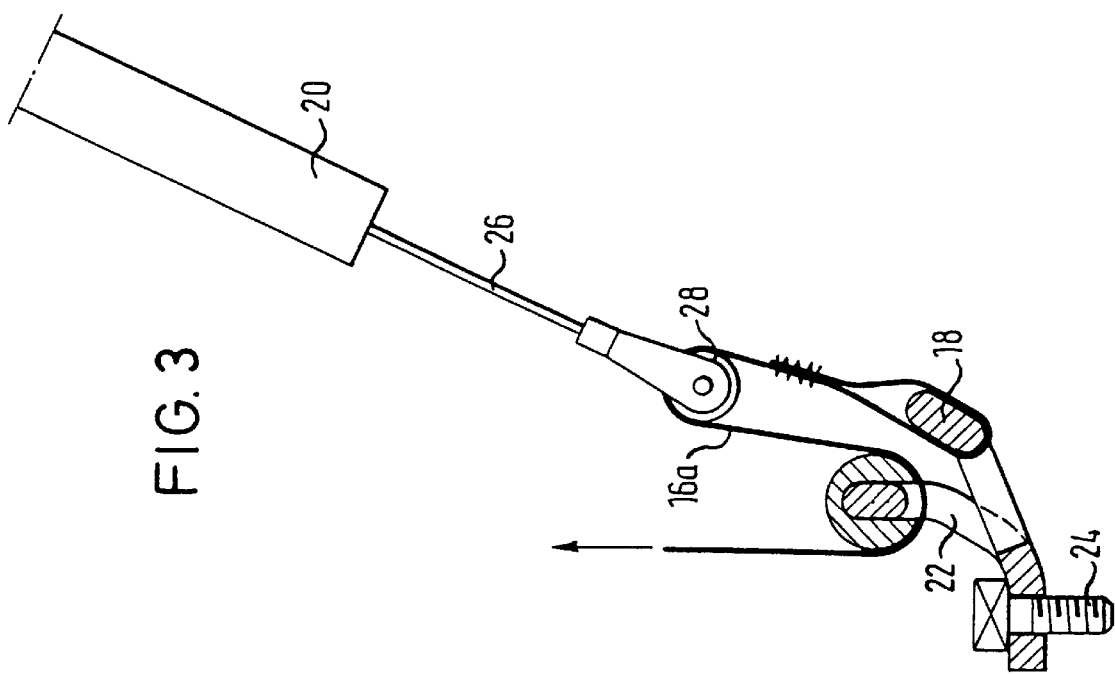
Fig. 3 shows a schematical partially cut view of parts of a second embodiment of the belt tensioner according to the invention.

FIG. 3 shows a second embodiment in which the end fitting 18 and a lower deflector fitting 22 are secured adjacent to each other to the vehicle body by a common through-bolt 24. The tensioner drive 20 engages the belt webbing between the deflector fitting 22 and the end fitting 18 via a cable 26 and a sheave 28 thereby forming a loop 16a in the belt webbing. The use of the cable 26 offers various possibilities for the arrangement of the tensioner drive 20. By forming the loop 16*a* in the belt webbing, the necessary tensioner stroke, to achieve a given shortening of the belt webbing, is halved. The belt tensioner 20 can therefore be shorter, which makes it easier to accommodate. To reduce friction between the belt webbing and the deflector fitting 22, the deflector fitting 22 is provided with a sheave. Similarly, the tensioner drive 20 engages the belt webbing by means of the sheave 28. Since the end fitting 18 and the lower deflector fitting 22 are secured to the vehicle body by the common through-bolt 24, no additional fastening point at the vehicle body has to be provided.

Figure 4:
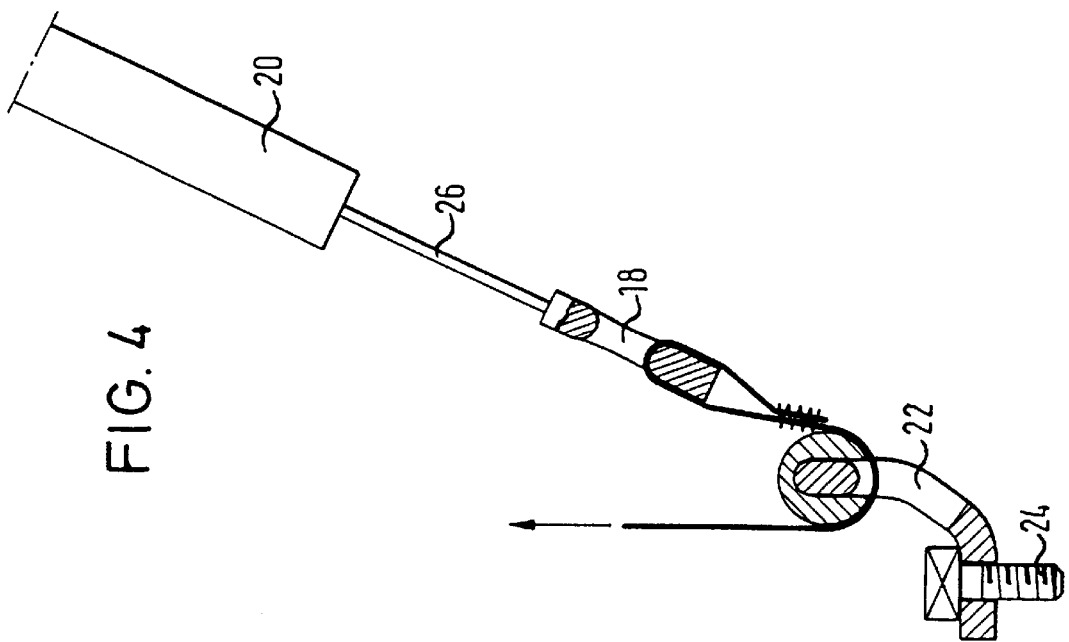
FIG. 4 shows a schematical partially cut view of parts of a further variant of the first embodiment of the inventive belt tensioner.

FIG. 4 shows a variant of the first embodiment, wherein the belt webbing is guided by a deflector fitting 22 and wherein the tensioner drive 20 engages the end fitting 18 directly via a cable 26. The deflector fitting 22 is provided with a sheave to reduce friction. The end fitting 18 is ring shaped and the belt webbing is secured to the end fitting 18 by a sewed belt webbing loop.

What is claimed is:

1. A belt tensioner for a 3-point vehicular seat belt system comprising:

a belt webbing;

a belt retractor as a first anchoring point;

a belt buckle as a second anchoring point;

an end fitting as a third anchoring point of the seat belt system; and a tensioner drive wherein said tensioner drive engages said seat belt webbing at a point of engagement next to said end fitting and between said belt buckle and said end fitting, said tensioner drive exerting tension on said belt webbing when activated;

said belt webbing being guided between said belt buckle and the point of engagement of said tensioner drive via a deflector fitting anchored to the vehicle body; and said tensioner drive engages said belt webbing between said deflector fitting and said end fitting thereby forming a belt loop.

2. The belt tensioner as set forth in claim 1, wherein said tensioner drive is formed by a pyrotechnical linear drive.

3. The belt tensioner as set forth in claim 1, wherein said deflector fitting and said end fitting are arranged alongside each other and are anchored to the vehicle body by means of a common through-bolt.

4. The belt tensioner as set forth in claim 1, wherein said deflector fitting is provided for low-friction particularly by employing a rotatable deflector sheave.

5. The belt tensioner as set forth in claim 1, wherein said deflector fitting is provided for low-friction particularly by employing a friction-diminishing surface structure of the deflector surface.

* * * * *

UNITED STATES PATENT AND TRADEMARK OFFICE
CERTIFICATE OF CORRECTION

PATENT NO : 5,845,939

DATED : December 8, 1998

INVENTOR(S) : Gerhard Greiner et al.

It is certified that error appears in the above-identified patent and that said Letters Patent is hereby corrected as shown below:

On title page, item 75 Inventors
 replace "Franz Wier, Untere Strasse"
 with --Franz Wier, Goggingen--.

Signed and Sealed this

First Day of June, 1999

Attest:

Q. TODD DICKINSON

Attesting Officer

Acting Commissioner of Patents and Trademarks